Aug. 9, 1955
G. CHAMBERLAIN
2,714,820
SPROCKET ASSEMBLY
Filed Jan. 24, 1952
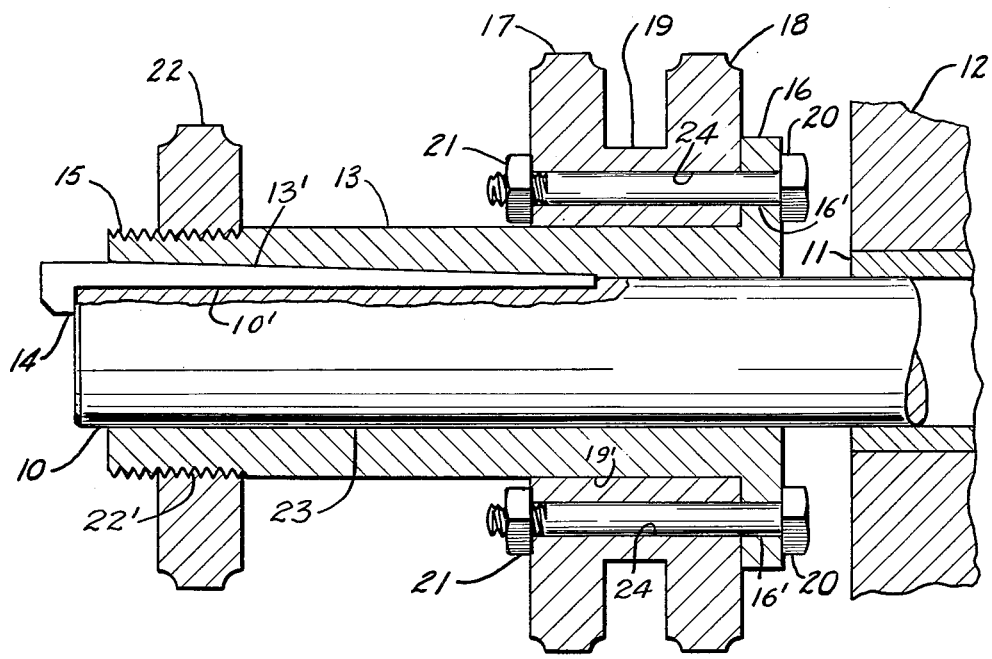
INVENTOR.
GLEN CHAMBERLAIN
BY Hubert Mille

2,714,820
SPROCKET ASSEMBLY

Glen Chamberlain, Wichita, Kans.

Application January 24, 1952, Serial No. 268,014

1 Claim. (Cl. 74—243)

This invention relates to power transmitting sprocket assemblies, and more particularly to a combined hub and sprocket assembly for removable installation on shafts.

There are decided disadvantages to hub and sprocket assemblies presently used on agricultural implements, such as grain combines. Present designs include an elongated hub, a small drive sprocket integral with one end of the hub, and a pair of larger diameter side by side power transmitting sprocket integral with the other end of the hub. The hub itself must be keyed to the shaft, and when installed the inner end of the hub abuts the shaft bearing and bearing supporting structure, while the key is driven into the combined shaft and hub keyway from the outer end of the hub.

The prime difficulty lies in replacement of worn sprockets, or in changing sprocket sizes. Since all three sprockets are integral with the hub, this means that the entire assembly must be replaced. The cost of replacement is exhorbitant considering that only a single sprocket may require replacement due to wear. In addition to the actual cost of the replacement assembly, however, there is normally a matter of 4 to 5 hours' labor time involved in removing the keyed sprocket from its shaft. The proximity of machine structure to the inner end of the hub prevents the hub from being driven off by hammer blows. This means the hub must be "pulled" off, which is extremely difficult since the key is always "frozen" in its key way, and each pull tends to tighten the hub on the shaft due to the wedge shape of the key.

It is the chief object of my invention to provide a hub and multi-sprocket assembly in which the sprockets are removably secured on the hub, thus making it possible to replace both the inside and outside sprockets from the outer end of the hub, and eliminating the necessity of removing the hub from its shaft. Such an assembly also greatly reduces maintenance costs for the operator by making it possible for him to buy and replace a single worn sprocket instead of buying the entire assembly. Furthermore it reduces the time for changing sprockets from 4 or 5 hours to approximately 5 minutes.

The invention, together with other objects, will be more clearly understood when the following description is read in connection with the accompanying drawings, in which:

The drawing view is a central longitudinal section through a sprocket assembly embodying my invention, showing it installed on a shaft.

Referring to the drawing, the numeral 10 indicates a shaft, 11 the shaft bearing, and 12 the bearing supporting structure, the shaft being provided with a conventional key way 10' open at the outer end of the shaft. My invention includes an elongated sleeve type hub 13 which is provided with a matching internal keyway 13' for receiving a wedge shaped key 14, which locks the hub 13 to the shaft 10 and locks the hub 13 against both longitudinal and rotational movement thereon. The outer end of the hub 13 is threaded as at 15, and the inner end is provided with a concentric annular flange 16 the side surfaces of which lie in parallel planes normal to the rotational axis of the hub 13. That portion of the hub 13 between threads 15 and flange 16 is preferably of constant diameter. The flange 16 is provided with a plurality of circumferentially spaced bolt holes 16' located equidistant from the rotational axis of the hub 13. The hub 13 is further provided with a central longitudinally extending bore 23 which is adapted to receive the shaft 10 therethrough.

A pair of side by side axially spaced sprockets 17 and 18 are integrally connected by a hub 19 having a central bore 19' extending therethrough which slidably fits the hub 13. Hub 19 is provided with circumferentially spaced bolt holes 24 which are spaced and located to register with the bolt holes 16' in flange 16 when the two are properly oriented. Bolts 20 pass through each of the holes 16' and 24 in the flange 16 and hub 19, and nuts 21 lock the sprockets 17 and 18 to the flange 16.

A drive sprocket 22 is provided with an internally threaded central bore 22' to fit the threaded outer end 15 of hub 13, it being understood the hand of the threads 15 and 22' will be determined by point of application of driving power, that is whether the sprocket 22 is to transmit power to hub 13 or vice versa, and by the rotational direction in which the power is to be transmitted. The hand of the threads 15 and 22' must always be such that the transmission of power will tend to screw the sprocket farther inward on the hub.

With the assembly described it will be easily understood that if drive sprocket 22 becomes worn or if it is desired to replace it with a different size sprocket, it is only necessary to unscrew it from hub 13. If it is desired to replace sprockets 17 and 18, sprocket 22 is first removed, nuts 21 are removed and the inner sprockets 17 and 18 may then be slipped off the outer end of the hub 13. It will also be understood that a single sprocket can be attached to flange 16 in the same manner as described for the double sprockets 17 and 18. Shorter bolts would, of course, be required.

Having described the invention with sufficient clarity to enable those familiar with this art to construct and use it, I claim:

The combination with a shaft having a keyway therein of a demountable sprocket assembly mounted on said shaft for rotation therewith comprising; an elongated sleeve type hub, said hub having a central longitudinal bore extending therethrough of a diameter sufficient to permit said hub to be mounted on said shaft, a flange integrally formed on one end of said hub and extending outwardly therefrom perpendicular to the axis of said bore, said hub having a keyway formed therein, a wedge shaped key engaged in said keyways to secure said hub to said shaft, an external thread formed on the free end of said hub opposite to said flange, a first sprocket positioned on said hub and against said flange, means passing through said first sprocket and said flange detachably securing said sprocket to said flange, and a second sprocket provided with an internally screw threaded bore engaged with the external threads on said free end of said hub, said screw threads on said hub and said second sprocket being formed to cause said second sprocket to be tightly secured to said shaft when said second sprocket is driven in one direction, said first sprocket having a bore sufficiently large to permit said first sprocket to be readily moved over said threaded end whereby said sprocket may be removed from said hub without removing said hub from said shaft.

References Cited in the file of this patent

UNITED STATES PATENTS

| | | |
|---|---|---|
| 709,644 | McLellan | Sept. 23, 1902 |
| 775,625 | Ingram | Nov. 22, 1904 |
| 826,129 | Troup | July 17, 1906 |
| 2,429,008 | Wolfe | Oct. 14, 1947 |
| 2,436,694 | Hornbrook, Jr., et al. | Feb. 24, 1948 |
| 2,525,516 | Bergmann et al. | Oct. 10, 1950 |